(12) United States Patent
Suzuki

(10) Patent No.: US 12,422,702 B2
(45) Date of Patent: Sep. 23, 2025

(54) MAGNETIC CIRCUIT, FARADAY ROTATOR, AND MAGNETO-OPTIC DEVICE

(71) Applicant: NIPPON ELECTRIC GLASS CO., LTD., Otsu (JP)

(72) Inventor: Futoshi Suzuki, Otsu (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 449 days.

(21) Appl. No.: 17/920,853

(22) PCT Filed: Jun. 2, 2021

(86) PCT No.: PCT/JP2021/020949
§ 371 (c)(1),
(2) Date: Oct. 24, 2022

(87) PCT Pub. No.: WO2021/256255
PCT Pub. Date: Dec. 23, 2021

(65) Prior Publication Data
US 2023/0168525 A1      Jun. 1, 2023

(30) Foreign Application Priority Data

Jun. 15, 2020   (JP) .................... 2020-103259

(51) Int. Cl.
*G02F 1/09* (2006.01)
*H01F 7/02* (2006.01)

(52) U.S. Cl.
CPC .............. *G02F 1/093* (2013.01); *H01F 7/02* (2013.01); *H01F 7/0205* (2013.01); *H01F 7/021* (2013.01)

(58) Field of Classification Search
USPC ..................................... 359/484.02, 484.03
See application file for complete search history.

(56) References Cited

U.S. PATENT DOCUMENTS

2009/0237771 A1   9/2009   Nakamura et al.
2012/0062992 A1   3/2012   Kimoto
(Continued)

FOREIGN PATENT DOCUMENTS

CN      102362211 A     2/2012
CN      105047355 A     11/2015
(Continued)

OTHER PUBLICATIONS

Official Communication issued in International Patent Application No. PCT/JP2021/020949, mailed on Jul. 27, 2021.
(Continued)

*Primary Examiner* — Dung T Nguyen
(74) *Attorney, Agent, or Firm* — Keating & Bennett, LLP

(57) ABSTRACT

Provided is a magnetic circuit which, with the use in an optical isolator, is less likely to cause the polarizer to be damaged even with higher laser output power. A magnetic circuit 1 includes first to third magnets 11 to 13 each provided with a through hole allowing light to pass through and is composed of the first to third magnets 11 to 13 arranged coaxially in this order in a front-to-rear direction, wherein one of the first and third magnets 11 and 13 is magnetized in a direction Y perpendicular to a direction X of an optical axis to have a north pole located toward the through hole 2, the other of the first and third magnets 11 and 13 is magnetized in a direction Y perpendicular to the direction X of the optical axis to have a south pole located toward the through hole 2, the second magnet 12 is magnetized in a direction parallel to the direction X of the optical axis to have a north pole located toward the one of the first and third magnets 11 and 13 having the north pole located toward the through hole 2, and a length L1 of the first magnet 11 along the direction X of the optical axis is
(Continued)

different from a length L3 of the third magnet 13 along the direction X of the optical axis.

4 Claims, 5 Drawing Sheets

(56) References Cited

U.S. PATENT DOCUMENTS

| | | | | |
|---|---|---|---|---|
| 2015/0198823 | A1* | 7/2015 | Ebenwalder | G02F 1/093 |
| | | | | 359/484.03 |
| 2021/0165252 | A1* | 6/2021 | Suzuki | G02F 1/093 |
| 2021/0231983 | A1* | 7/2021 | Suzuki | G02F 1/093 |
| 2022/0146866 | A1* | 5/2022 | Yahagi | G02F 1/093 |

FOREIGN PATENT DOCUMENTS

| | | |
|---|---|---|
| CN | 107942542 A | 4/2018 |
| CN | 110609401 A | 12/2019 |
| CN | 210155454 U | 3/2020 |
| CN | 218272948 U | 1/2023 |
| JP | 4-6018 U | 1/1992 |
| JP | 2012-083381 A | 4/2012 |
| JP | 5239431 B2 | 7/2013 |
| JP | 2016-024357 A | 2/2016 |
| JP | 2019-211753 A | 12/2019 |
| WO | 2011/078381 A1 | 6/2011 |
| WO | WO 2020085017 * | 4/2020 |

OTHER PUBLICATIONS

Official Communication issued in corresponding Chinese Patent Application No. 202180014019.X, mailed on Jul. 17, 2025, 12 pages.

* cited by examiner

[FIG. 1.]
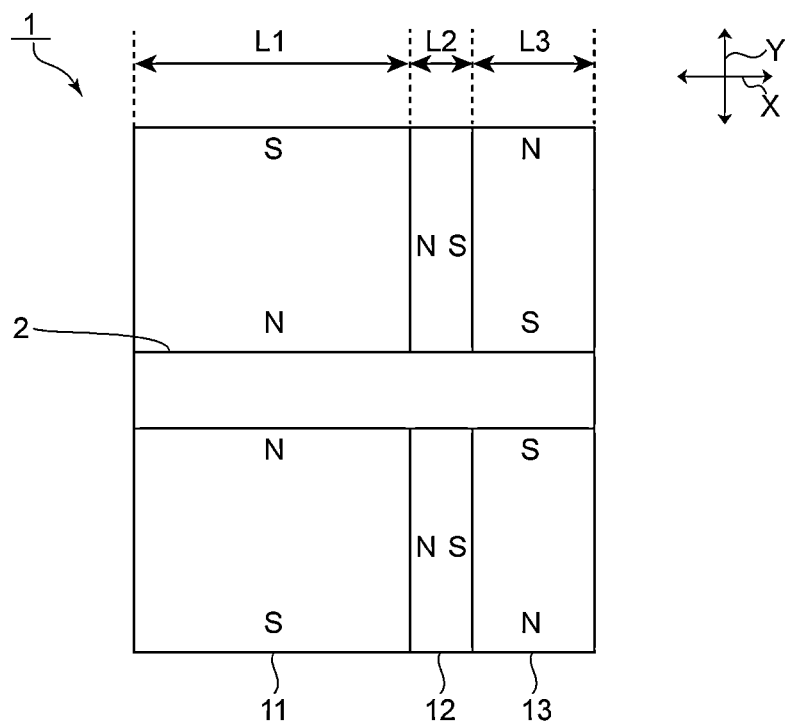
[FIG. 2.]
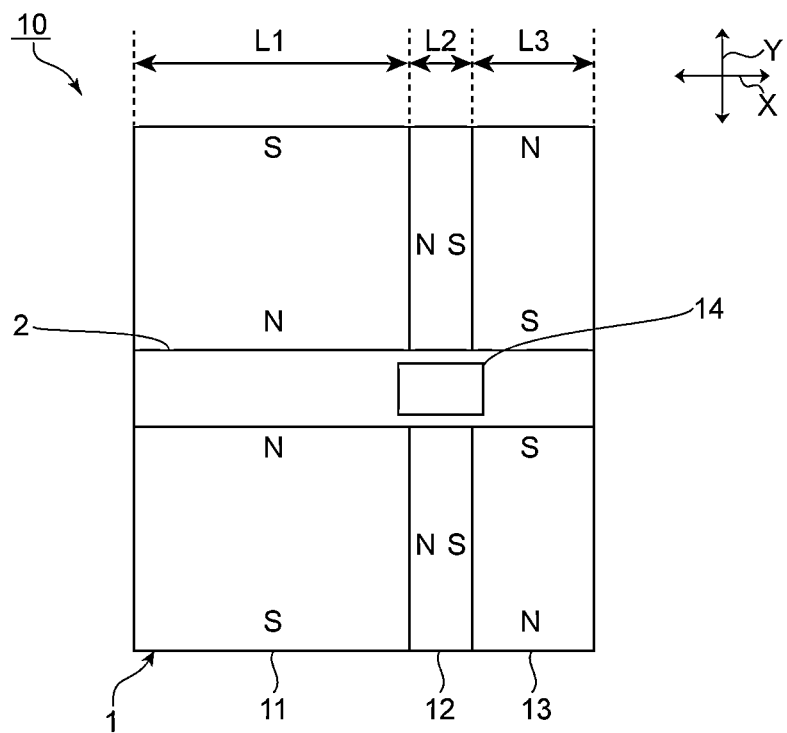

[FIG. 3.]
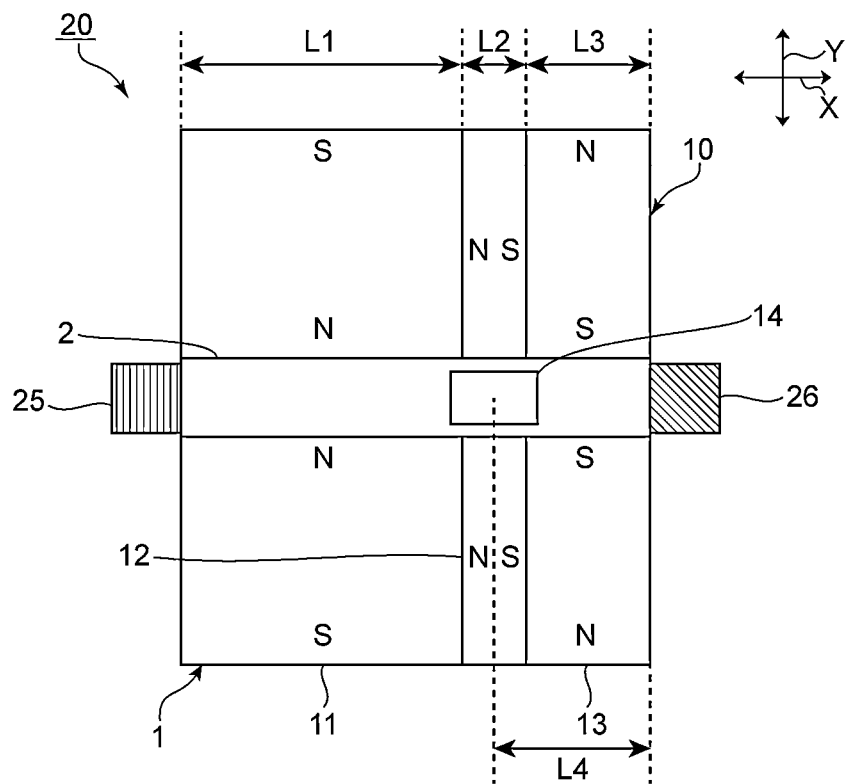
[FIG. 4.]
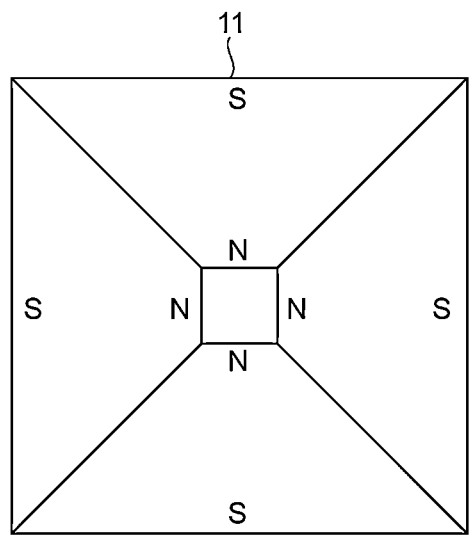

[FIG. 5.]
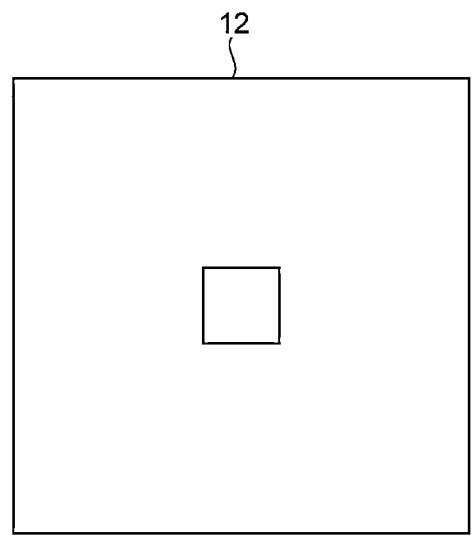
[FIG. 6.]
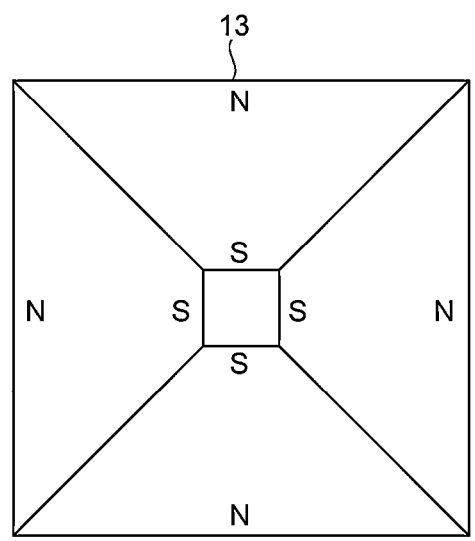

[FIG. 7.]
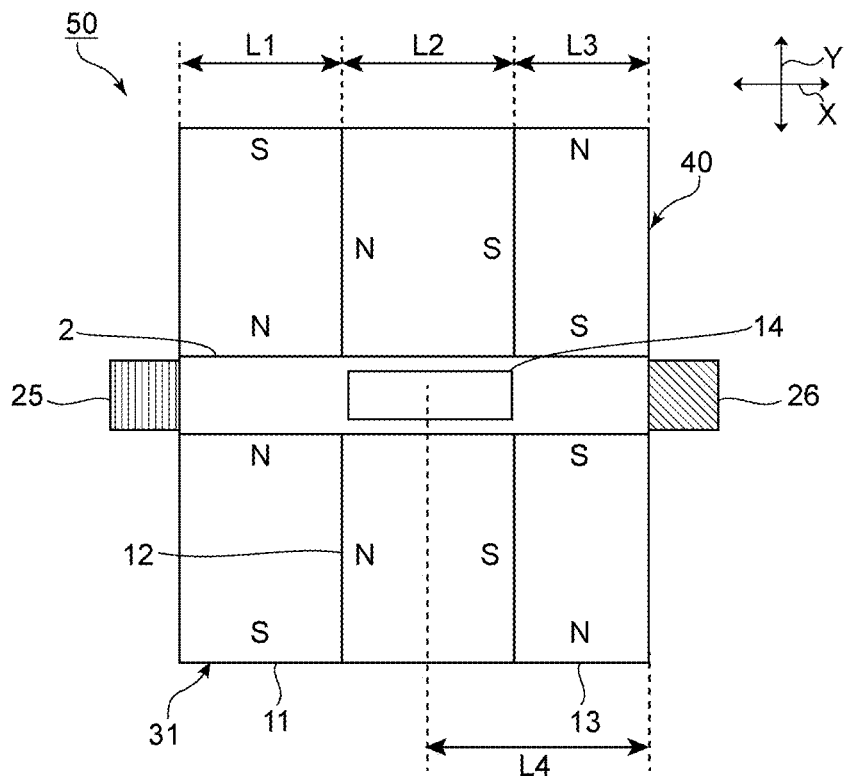
[FIG. 8.]
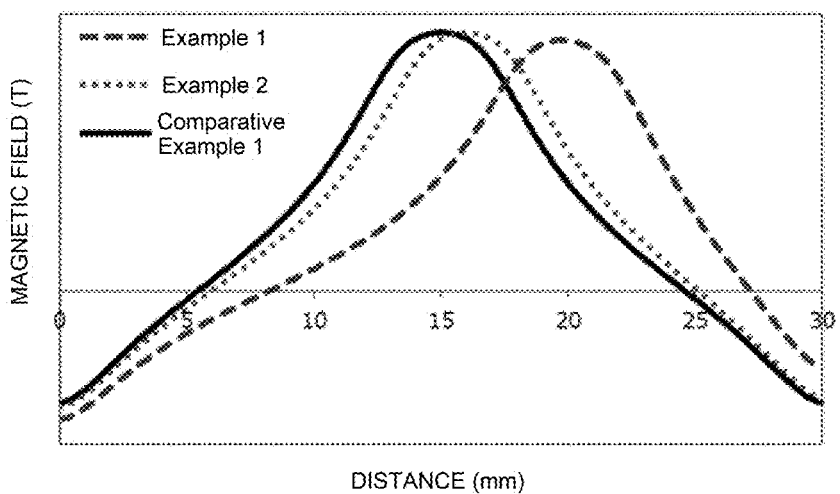

[FIG. 9.]
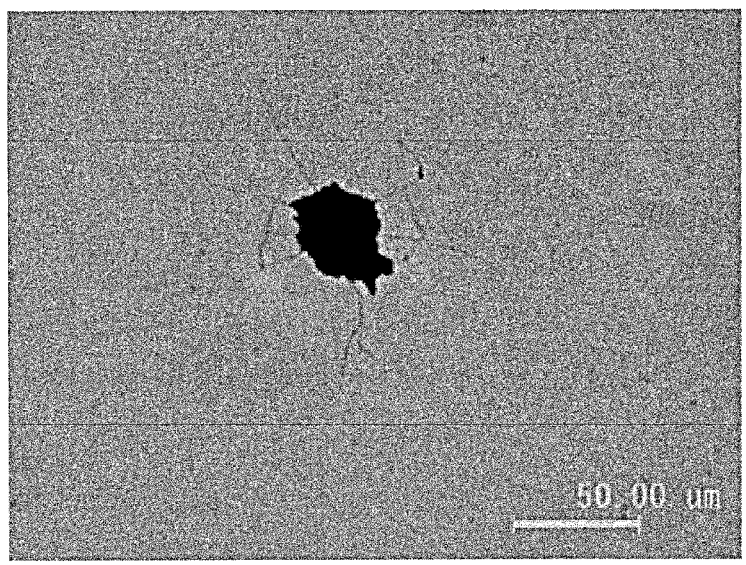

MAGNETIC CIRCUIT, FARADAY ROTATOR, AND MAGNETO-OPTIC DEVICE

TECHNICAL FIELD

The present invention relates to magnetic circuits, Faraday rotators, and magneto-optic devices.

BACKGROUND ART

Optical isolators are magneto-optic devices that propagate light in a single direction and block reflected return light. Optical isolators are used in laser oscillators for use in optical communication systems, laser processing systems, and so on. Generally, an optical isolator includes a Faraday rotator and respective polarizers disposed at one end and the other end of the Faraday rotator in the direction of the optical axis.

Conventionally, the wavelength range for use in optical communication systems is mainly from 1300 nm to 1700 nm and, therefore, rare-earth iron garnet is used as a Faraday element of a Faraday rotator in an optical isolator.

On the other hand, the wavelengths for use in laser processing and the like are shorter than the optical communication band and are mainly at around 1000 nm. In this wavelength range, rare-earth iron garnet described above shows high light absorption and, therefore, cannot be used. For this reason, a Faraday element made of paramagnetic material crystals is generally used. Particularly, terbium gallium garnet (TGG) is widely known.

In order to use a Faraday element in an optical isolator, its rotation angle (θ) due to Faraday rotation needs to be 45°. This Faraday rotation angle has a relationship shown in the following Equation (1) with the length (L) of a Faraday element, a Verdet constant (V), and a magnetic flux density (H) parallel to the optical axis.

$$\theta = V \cdot H \cdot L \tag{1}$$

In this equation, the Verdet constant (V) is a characteristic depending upon the material. Therefore, in order to adjust the Faraday rotation angle, it is necessary to change the length (L) of the Faraday element and the magnetic flux density (H) applied in parallel with the optical axis to the Faraday element. Particularly, because of recent demand for size reduction of devices, the magnetic flux density applied to the Faraday rotator is being improved not by adjusting the sizes of the Faraday element and magnets, but by changing the structure of the magnets.

For example, Patent Literature 1 below discloses a Faraday rotator including: a magnetic circuit composed of first to third magnets; and a Faraday element. The first magnet is magnetized in a direction perpendicular to the optical axis and toward the optical axis. The second magnet is magnetized in a direction perpendicular to the optical axis and away from the optical axis. The third magnet is disposed between the above two magnets. The third magnet is magnetized in a direction parallel to the optical axis and from the second magnet toward the first magnet. This magnetic circuit is constructed so that a relationship L2/10≤L3≤L2 holds where L2 represents the length of the first and second magnets along the direction of the optical axis and L3 represents the length of the third magnet along the direction of the optical axis.

CITATION LIST

Patent Literature

PTL 1

JP-B2-5239431

SUMMARY OF INVENTION

Technical Problem

With the recent increase in output power of laser processing, optical isolators are required to have high laser tolerance. However, if an optical isolator with such a Faraday rotator as in Patent Literature 1 is used with higher laser output power, its polarizer may be damaged.

An object of the present invention is to provide a magnetic circuit, a Faraday rotator, and a magneto-optic device all of which, with the use in an optical isolator, are less likely to cause the polarizer to be damaged even with higher laser output power.

Solution to Problem

A magnetic circuit according to the present invention is a magnetic circuit including first to third magnets each provided with a through hole allowing light to pass through and is composed of the first to third magnets arranged coaxially in this order in a front-to-rear direction, wherein when a direction of light passing through the through hole in the magnetic circuit is defined as a direction of an optical axis, one of the first and third magnets is magnetized in a direction perpendicular to the direction of the optical axis to have a north pole located toward the through hole, the other of the first and third magnets is magnetized in a direction perpendicular to the direction of the optical axis to have a south pole located toward the through hole, and the second magnet is magnetized in a direction parallel to the direction of the optical axis to have a north pole located toward the one of the first and third magnets having the north pole located toward the through hole, and wherein a length of the first magnet along the direction of the optical axis is different from a length of the third magnet along the direction of the optical axis.

In the present invention, preferably, the first magnet is magnetized in the direction perpendicular to the direction of the optical axis to have a north pole located toward the through hole, the second magnet is magnetized in the direction parallel to the direction of the optical axis to have a north pole located toward the first magnet, the third magnet is magnetized in the direction perpendicular to the direction of the optical axis to have a south pole located toward the through hole, and a relationship L3<L1 holds where L1 represents the length of the first magnet along the direction of the optical axis and L3 represents the length of the third magnet along the direction of the optical axis.

In the present invention, a relationship L2<L3<L1 preferably holds where L2 represents a length of the second magnet along the direction of the optical axis.

A Faraday rotator according to the present invention includes: the magnetic circuit constructed according to the present invention; and a Faraday element disposed in the through hole in the magnetic circuit and made of a paramagnetic material capable of transmitting light.

In the present invention, the paramagnetic material is preferably a glass material.

A magneto-optic device according to the present invention includes: the Faraday rotator constructed according to the present invention; a first optical component disposed at one end of the Faraday rotator in the direction of the optical axis; and a second optical component disposed at the other end of the Faraday rotator in the direction of the optical axis, wherein light through the through hole in the magnetic circuit passes through the first optical component and the second optical component.

In the present invention, the first optical component and the second optical component are preferably polarizers.

A magneto-optic device according to the present invention is a magneto-optic device including: a Faraday rotator which includes a magnetic circuit including first to third magnets each provided with a through hole allowing light to pass through and a Faraday element disposed in the through hole in the magnetic circuit and made of a paramagnetic material capable of transmitting light; a first optical component disposed at one end of the Faraday rotator in a direction of an optical axis; and a second optical component disposed at the other end of the Faraday rotator in the direction of the optical axis, light through the through hole in the magnetic circuit passing through the first optical component and the second optical component, wherein the magnetic circuit is composed of the first to third magnets arranged coaxially in this order in a front-to-rear direction, wherein when a direction of light passing through the through hole in the magnetic circuit is defined as the direction of the optical axis, one of the first and third magnets is magnetized in a direction perpendicular to the direction of the optical axis to have a north pole located toward the through hole, the other of the first and third magnets is magnetized in a direction perpendicular to the direction of the optical axis to have a south pole located toward the through hole, and the second magnet is magnetized in a direction parallel to the direction of the optical axis to have a north pole located toward the one of the first and third magnets having the north pole located toward the through hole, and wherein a distance from a center of the Faraday element to the first optical component along the direction of the optical axis is different from a distance from the center of the Faraday element to the second optical component along the direction of the optical axis.

In the present invention, preferably, the second optical component is disposed toward the third magnet in the direction of the optical axis, and a ratio L4/(L1+L2+L3) is in a range of not less than 0.2 and less than 0.5 where (L1+L2+L3) represents a sum of respective lengths of the first magnet, the second magnet, and the third magnet along the direction of the optical axis and L4 represents the distance from the center of the Faraday element to the second optical component along the direction of the optical axis.

In the present invention, the Faraday element is preferably disposed in a center of the second magnet.

Advantageous Effects of Invention

The present invention enables provision of a magnetic circuit, a Faraday rotator, and a magneto-optic device all of which, with the use in an optical isolator, are less likely to cause the polarizer to be damaged even with higher laser output power.

BRIEF DESCRIPTION OF DRAWINGS

FIG. 1 is a schematic cross-sectional view showing the structure of a magnetic circuit according to a first embodiment of the present invention.

FIG. 2 is a schematic cross-sectional view showing the structure of a Faraday rotator according to the first embodiment of the present invention.

FIG. 3 is a schematic cross-sectional view showing the structure of a magneto-optic device according to the first embodiment of the present invention.

FIG. 4 is a view showing an example of a structure of a first magnet in the present invention.

FIG. 5 is a view showing an example of a structure of a second magnet in the present invention.

FIG. 6 is a view showing an example of a structure of a third magnet in the present invention.

FIG. 7 is a schematic cross-sectional view showing the structures of a magnetic circuit, a Faraday rotator, and a magneto-optic device according to a second embodiment of the present invention.

FIG. 8 is a graph showing respective field intensities of magnetic circuits in Examples 1 and 2 and Comparative Example 1.

FIG. 9 is a photograph showing an example of a damaged polarizer.

DESCRIPTION OF EMBODIMENTS

Hereinafter, a description will be given of preferred embodiments. However, the following embodiments are merely illustrative and the present invention is not limited to the following embodiments. Throughout the drawings, members having substantially the same functions may be referred to by the same reference characters.

First Embodiment

FIG. 1 is a schematic cross-sectional view showing the structure of a magnetic circuit according to a first embodiment of the present invention. FIG. 2 is a schematic cross-sectional view showing the structure of a Faraday rotator according to the first embodiment of the present invention. FIG. 3 is a schematic cross-sectional view showing the structure of a magneto-optic device according to the first embodiment of the present invention. The letters N and S in the figures represent magnetic poles.

(Magnetic Circuit)

As shown in FIG. 1, a magnetic circuit 1 includes a first magnet 11, a second magnet 12, and a third magnet 13, each provided with a through hole. The magnetic circuit 1 is composed of the first magnet 11, the second magnet 12, and the third magnet 13 coaxially arranged in this order in a front-to-rear direction. The term "coaxially arranged" means that the above magnets are arranged so that their substantially central portions are laid one on another as viewed in the direction X of the optical axis. In this embodiment, a through hole 2 in the magnetic circuit 1 is formed by the connection of the respective through holes in the first magnet 11, the second magnet 12, and the third magnet 13 one to another.

A Faraday element 14 to be described hereinafter can be disposed in the through hole 2 in the magnetic circuit 1. Thus, a Faraday rotator 10 for use in a magneto-optic device 20, such as an optical isolator or an optical circulator can be constructed.

The cross-sectional shape of the through hole 2 in the magnetic circuit 1 is not particularly limited and may be rectangular or circular. The cross-sectional shape thereof is preferably rectangular from the perspective of ease of assembly or preferably circular from the perspective of application of a uniform magnetic field.

FIG. 4 is a view showing an example of a structure of the first magnet (a view from the direction X of the optical axis). The first magnet 11 shown in FIG. 4 is formed by a combination of four magnet pieces and has a rectangular (square) cross-sectional shape as a whole. The first magnet 11 may have a circular cross-sectional shape as a whole. The number of magnet pieces constituting the first magnet 11 is not limited to the above. For example, the first magnet 11 may be formed by a combination of six or eight magnet pieces. By forming the first magnet 11 in combination of a plurality of magnet pieces, the magnetic field can be effectively increased. However, the first magnet 11 may be constituted by a single magnet.

FIG. 5 is a view showing an example of a structure of the second magnet (a view from the direction X of the optical axis). The second magnet 12 shown in FIG. 5 is constituted by a single magnet. The second magnet 12 has a rectangular (square) cross-sectional shape. The second magnet 12 may have a circular cross-sectional shape. However, the second magnet 12 may be formed by a combination of two or more magnet pieces.

FIG. 6 is a view showing an example of a structure of the third magnet (a view from the direction X of the optical axis). The third magnet 13 shown in FIG. 6 is, like the first magnet 11, formed by a combination of four magnet pieces and has a rectangular (square) cross-sectional shape as a whole. The third magnet 13 may have a circular cross-sectional shape as a whole. By forming the third magnet 13 in combination of a plurality of magnet pieces, the magnetic field can be effectively increased. However, the third magnet 13 may be formed by a combination of six or eight magnet pieces or constituted by a single magnet.

The first magnet 11, the second magnet 12, and the third magnet 13 are each formed of a permanent magnet. Rare-earth magnets are particularly preferred as the permanent magnet and, among them, a magnet consisting mainly of samarium-cobalt (Sm—Co) or a magnet consisting mainly of neodymium-iron-boron (Nd—Fe—B) is preferred.

In the magnetic circuit 1, the first magnet 11 and the third magnet 13 are magnetized in directions Y perpendicular to the direction X of the optical axis and their magnetization directions are opposite to each other. Specifically, the first magnet 11 is magnetized in a direction Y perpendicular to the direction X of the optical axis to have a north pole located toward the through hole 2. The third magnet 13 is magnetized in a direction Y perpendicular to the direction X of the optical axis to have a south pole located toward the through hole 2. The second magnet 12 is magnetized in a direction parallel to the direction X of the optical axis to have a north pole located toward the first magnet 11. Herein, the direction where light passes through the through hole 2 in the magnetic circuit 1 is defined as the direction X of the optical axis.

In the magnetic circuit 1, the length L3 of the third magnet 13 is shorter than the length L1 of the first magnet 11. Furthermore, the length L2 of the second magnet 12 is shorter than the length L1 of the first magnet 11 and the length L3 of the third magnet 13. Therefore, in the magnetic circuit 1, a relationship L2<L3<L1 holds. The length L1 of the first magnet 11, the length L2 of the second magnet 12, and the length L3 of the third magnet 13 are all those along the direction X of the optical axis.

A feature of this embodiment is that the length L3 of the third magnet 13 is shorter than the length L1 of the first magnet 11. Thus, with the use in an optical isolator, the magnetic circuit can be less likely to cause the polarizer to be damaged even with higher laser output power. This can be explained as follows.

Conventionally, an optical isolator has a problem that the polarizer is likely to be damaged with higher laser output power. The inventors conducted intensive studies on the reason for the above and, as a result, thought that the reason was that when the laser output power was increased, the Faraday element developed a thermal lens effect. Specifically, when the laser output power is increased, the central portion of the Faraday element becomes hotter and the Faraday element therefore has a temperature gradient. As a result, due to the temperature dependency of the refractive index, the Faraday element generates a refractive index gradient. Thus, a phenomenon occurs that the Faraday element acts as a lens and laser light having passed through the Faraday element is focused. It can be considered that in doing so, because of the structure of the optical isolator in which the Faraday element is disposed between two polarizers, the light having passed through the Faraday element is focused by the thermal lens effect to make the beam diameter of the incident light beam small, which invites a problem that the polarizer disposed at the light output side has a large energy density and is thus damaged. FIG. 9 shows a photograph as an example of a polarizer damaged by the above thermal lens effect. In many cases, a damage to the polarizer is that the surface of the polarizer located at the light output side is broken (for example, cracked) by insulation breakdown. If such a damage to the polarizer occurs, the transmittance of the polarizer falls abruptly.

Unlike the above, in this embodiment, since the length L3 of the third magnet 13 is shorter than the length L1 of the first magnet 11, the Faraday element 14 and the polarizer (the second optical component 26) can be brought closer together. Therefore, even if a thermal lens effect occurs, the amount of light focused is reduced, which makes it possible to reduce the increase in energy density and reduce the damage to the polarizer.

When the length L3 of the third magnet 13 is shorter than the length L1 of the first magnet 11, the Faraday element 14 deviates from the center of the magnetic circuit 1 as shown in FIG. 2. However, the inventors found that, also in this case, magnetic properties equivalent to those when the Faraday element 14 is disposed in the center of the magnetic circuit 11 can be obtained.

Although the description in this embodiment has been given of the case where light is allowed to enter the magnetic circuit first through the first magnet 11, light may be allowed to enter the magnetic circuit first through the third magnet 13. In this case, by making the length L1 of the first magnet 11 shorter than the length L3 of the third magnet 13, the polarizer can be less likely to be damaged even with higher laser output power. Therefore, in the present invention, it is only necessary to make the length L1 of the first magnet 11 different from the length L3 of the third magnet 13.

Furthermore, in this case, it is also possible that the first magnet 11 is magnetized to have a south pole located toward the through hole 2, the third magnet 13 is magnetized to have a north pole located toward the through hole 2, and the second magnet 12 is magnetized to have a south pole located toward the first magnet 11.

In addition, in this embodiment, the length L2 of the second magnet 12 is shorter than the length L1 of the first magnet 11 and the length L3 of the third magnet 13. Therefore, the magnetic properties can be further increased and a larger magnetic field can be applied to the Faraday element 14. By applying a large magnetic field to the Faraday element 14, the isolation properties of an optical isolator can be further increased.

In this embodiment, the ratio L1/L3 between the length L1 of the first magnet 11 and the length L3 of the third magnet 13 is preferably 1.01 or more, more preferably 1.03 or more, still more preferably 1.05 or more, yet still more preferably 1.07 or more, particularly preferably 1.10 or more, and most preferably 1.11 or more, preferably 3.00 or less, more preferably 2.90 or less, still more preferably 2.80 or less, yet still more preferably 2.70 or less, particularly preferably 2.60 or less, and most preferably 2.50 or less.

When the ratio L1/L3 is the above lower limit or more, the polarizer can be further less likely to be damaged even with higher laser output power. Furthermore, when the ratio L1/L3 is the above upper limit or less, an even larger magnetic field can be applied to the Faraday element 14.

The ratio L2/L3 between the length L2 of the second magnet 12 and the length L3 of the third magnet 13 is preferably 0.05 or more, more preferably 0.10 or more, still more preferably 0.15 or more, and particularly preferably 0.20 or more, preferably 0.95 or less, more preferably 0.85 or less, still more preferably 0.80 or less, and particularly preferably 0.75 or less.

When the ratio L2/L3 is in the above range, an even larger magnetic field can be applied to the Faraday element 14.
(Faraday Rotator)

A Faraday rotator 10 shown in FIG. 2 is a device for use in a magneto-optic device 20 to be described hereinafter, such as an optical isolator or an optical circulator. The Faraday rotator 10 includes the magnetic circuit 1 and a Faraday element 14 disposed in the through hole 2 in the magnetic circuit 1. The Faraday element 14 is made of a paramagnetic material capable of transmitting light.

The Faraday rotator 10 includes the magnetic circuit 1 according to the first embodiment shown in FIG. 1. Therefore, with the use in an optical isolator, the Faraday rotator 10 can be less likely to cause the polarizer to be damaged even with higher laser output power.

Light may be allowed to enter the Faraday rotator 10 first through the first magnet 11 or first through the third magnet 13. In the case where light is allowed to enter the Faraday rotator 10 first through the third magnet 13, by making the length L1 of the first magnet 11 shorter than the length L3 of the third magnet 13, the polarizer can be less likely to be damaged even with higher laser output power.

The cross-sectional shape of the Faraday element 14 and the cross-sectional shape of the through hole 2 in the magnetic circuit 1 need not necessarily agree with each other, but should preferably agree with each other from the perspective of application of a uniform magnetic field.

A paramagnetic material can be used as the Faraday element 14. Among paramagnetic materials, a glass material is preferably used. A Faraday element 14 made of a glass material is less likely to cause variations in Verdet constant and reduction in extinction ratio due to defects and so on, which single-crystal materials would have, is less affected by stress from an adhesive material, and therefore can maintain a stable Verdet constant and a high extinction ratio. When the Faraday element 14 is made of a glass material having a low thermal conductivity, the above-described thermal lens effect is more likely to occur and, therefore, the effects of the present invention can be more effectively achieved.

The glass material for use as the Faraday element 14 preferably contains, in terms of oxide equivalent % by mole, more than 20% $Tb_2O_3$, more preferably 25% or more $Tb_2O_3$, still more preferably 29% or more $Tb_2O_3$, yet still more preferably 30% or more $Tb_2O_3$, even more preferably 31% or more $Tb_2O_3$, even still more preferably 35% or more $Tb_2O_3$, even yet still more preferably 40% or more $Tb_2O_3$, further more preferably 45% or more $Tb_2O_3$, further still more preferably 48% or more $Tb_2O_3$, and particularly preferably 51% or more $Tb_2O_3$. When the content of $Tb_2O_3$ is large as just described, a good Faraday effect can be easily obtained. Tb in the glass is present in the trivalent or tetravalent state, but all of these Tb states are expressed as $Tb_2O_3$ equivalents herein.

In the glass material for use as the Faraday element 14, the proportion of $Tb^{3+}$ to the total amount of Tb is, in terms of % by mole, preferably 55% or more, more preferably 60% or more, still more preferably 80% or more, and particularly preferably 90% or more. If the proportion of $Tb^{3+}$ to the total amount of Tb is too small, the light transmittance at wavelengths of 300 nm to 1100 nm is likely to decrease.
(Magneto-Optic Device)

A magneto-optic device 20 shown in FIG. 3 is an optical isolator. The magneto-optic device 20 includes: the Faraday rotator 10 shown in FIG. 2; a first optical component 25 disposed at one end of the magnetic circuit 1 in the direction X of the optical axis; and a second optical component 26 disposed at the other end of the magnetic circuit 1 in the direction X of the optical axis. In this embodiment, the first optical component 25 and the second optical component 26 are polarizers. The light transmission axis of the second optical component 26 is inclined at 45° to the light transmission axis of the first optical component 25.

Light incident on the magneto-optic device 20 passes through the first optical component 25, is converted to linearly polarized light, and then enters the Faraday element 14. The light having entered the Faraday element 14 is rotated 45° by the Faraday element 14 and then passes through the second optical component 26. Part of the light having passed through the second optical component 26 becomes reflected return light and passes through the second optical component 26, with a plane of polarization rotated at an angle of 45°. The reflected return light having passed through the second optical component 26 is further rotated 45° by the Faraday element 14 and thus forms a perpendicular plane of polarization inclined at 90° to the light transmission axis of the first optical component 25. Therefore, the reflected return light cannot pass through the first optical component 25 and is blocked by the first optical component 25.

The magneto-optic device 20 according to the present invention includes the magnetic circuit 1 according to the first embodiment shown in FIG. 1. In other words, the distance from the center of the Faraday element 14 to the first optical component 25 along the direction X of the optical axis is different from the distance from the center of the Faraday element 14 to the second optical component 26 along the direction X of the optical axis. Therefore, the polarizer can be further less likely to be damaged even with higher laser output power.

Furthermore, in the magneto-optic device 20, where (L1+L2+L3) represents the sum of the respective lengths of the first magnet 11, the second magnet 12, and the third magnet 13 along the direction X of the optical axis and L4 represents the distance from the center of the Faraday element 14 to the second optical component 26 (the end surface of the second optical component 26 toward the Faraday rotator 10) along the direction X of the optical axis, a ratio L4/(L1+L2+L3) is preferably 0.2 or more, more preferably 0.25 or more, still more preferably 0.27 or more, and particularly preferably 0.3 or more, preferably less than 0.5, more preferably 0.49 or less, still more preferably 0.48 or less, and particularly preferably 0.47 or less.

When the ratio L4/(L1+L2+L3) is the above lower limit or more, an even larger magnetic field can be applied to the Faraday element 14. Furthermore, when the ratio L4/(L1+L2+L3) is the above upper limit or less, the polarizer can be further less likely to be damaged even with higher laser output power.

In this embodiment, the end surface of the Faraday rotator 10 located toward the third magnet 13 is coincident, in terms of location relative to the direction X of the optical axis, with the end surface of the second optical component 26 toward the Faraday rotator 10. Therefore, in this embodiment, L4 agrees with the distance from the center of the Faraday element 14 to the end surface of the Faraday rotator 10 toward the third magnet 13 along the direction X of the optical axis.

In this embodiment, the Faraday element 14 is disposed in the center of the second magnet 12. In other words, the center of the Faraday element 14 is coincident with the center of the second magnet 12 in the direction X of the optical axis. In this case, an even larger magnetic field can be applied to the Faraday element 14.

Although the magneto-optic device 20 shown in FIG. 3 is an optical isolator, the magneto-optic device 20 may be an optical circulator. In this case, the first optical component 25 and the second optical component 26 may be a wavelength plate or a beam splitter. However, the magneto-optic device 20 is not limited to an optical isolator and an optical circulator.

Second Embodiment

FIG. 7 is a schematic cross-sectional view showing the structures of a magnetic circuit, a Faraday rotator, and a magneto-optic device according to a second embodiment of the present invention.

As shown in FIG. 7, in a magnetic circuit 31, the length L1 of the first magnet 11 and the length L3 of the third magnet 13 are shorter than the length L2 of the second magnet 12. Also in the magnetic circuit 31, the length L3 of the third magnet 13 is shorter than the length L1 of the first magnet 11. Therefore, in the magnetic circuit 31, a relationship L3<L1<L2 holds.

A Faraday rotator 40 includes the magnetic circuit 31 and a Faraday element 14 disposed in a through hole 2 in the magnetic circuit 31. A magneto-optic device 50 includes: the Faraday rotator 40; a first optical component 25 disposed at one end of the magnetic circuit 31 in the direction X of the optical axis; and a second optical component 26 disposed at the other end of the magnetic circuit 31 in the direction X of the optical axis. The rest is the same as in the first embodiment.

As exemplified by the second embodiment, the length L1 of the first magnet 11 and the length L3 of the third magnet 13 may be shorter than the length L2 of the second magnet 12. Also in this case, by making the length L1 of the first magnet 11 different from the length L3 of the third magnet 13, the polarizer can be further less likely to be damaged even with higher laser output power.

However, in the present invention, the length L1 of the first magnet 11, the length L2 of the second magnet 12, and the length L3 of the third magnet 13 preferably satisfy a relationship L2<L3<L1. In this case, the magnetic properties can be further increased and an even larger magnetic field can be applied to the Faraday element 14.

Also in this embodiment, the Faraday element 14 is disposed in the center of the second magnet 12. In other words, the center of the Faraday element 14 is coincident with the center of the second magnet 12 in the direction X of the optical axis. In this case, an even larger magnetic field can be applied to the Faraday element 14.

EXAMPLES

Hereinafter, the present invention will be described in further detail with reference to specific examples. The present invention is not at all limited by the following examples and modifications and variations may be appropriately made therein without changing the gist of the invention.

Examples 1 to 5 and Comparative Example 1

Table 1 shows Examples 1 to 5 of the present invention and Comparative Example 1.

TABLE 1

|  | Ex. 1 | Ex. 2 | Ex. 3 | Ex. 4 | Ex. 5 | Comp. Ex. 1 |
|---|---|---|---|---|---|---|
| L1 (mm) | 18 | 14 | 16 | 13 | 10 | 13 |
| L2 (mm) | 4 | 4 | 6 | 6 | 11 | 4 |
| L3 (mm) | 8 | 12 | 8 | 11 | 9 | 13 |
| Distance L4 between Faraday Element and Polarizer (mm) | 10.3 | 14 | 11 | 14 | 14.5 | 15 |
| Laser Output Power at Which Polarizer Has Been Damaged (W) | 100 | 50 | 80 | 50 | 40 | 30 |

Magnetic circuits in Examples 1 to 5 and Comparative Example 1 had a structure having a 40 mm×40 mm square cross-sectional shape as a whole and including a through hole 2 of a 4 mm×4 mm square cross-sectional shape. The respective lengths L1, L2, and L3 of the first magnet 11, the second magnet 12, and the third magnet 13 along the direction X of the optical axis were as shown in Table 1. Therefore, the magnetic circuits in Examples 1 to 4 had the same structure in terms of lengths L1, L2, and L3 as in the magnetic circuit 1 shown in FIG. 1. The magnetic circuit in Example 5 had the same structure in terms of lengths L1, L2, and L3 as in the magnetic circuit 31 shown in FIG. 7. Comparative Example 1 had a structure in which the lengths L1, L2, and L3 along the direction X of the optical axis satisfied a relation L1=L3>L2.

The type of all the magnets used was a Nd—Fe—B-based magnet. The remanent flux density of this magnet was 1.25 T and the coercivity thereof was 940 kA/m.

FIG. 8 shows respective field intensities of the magnetic circuits in Examples 1 and 2 and Comparative Example 1. The horizontal axis represents the distance in the direction X of the optical axis. The distance in the direction X of the optical axis was defined as 0 mm at an end of the magnetic circuit facing the first optical component 25. When the lengths L1 and L3 are equal to each other as in Comparative Example 1, the location at which the field intensity reaches a maximum is a distance of 15 mm which is in the middle of the magnetic circuit.

When a magnetic circuit 1 is constructed so that the lengths L1, L2, and L3 are different from each other as in Examples 1 and 2, the location at which the field intensity reaches a maximum can be shifted from the middle of the magnetic circuit. The location at which the field strength reaches a maximum was 19.7 mm and 16 mm in Examples 1 and 2, respectively. In Examples 1 and 2 and Comparative Example 1, their maximum field strengths were substantially equal to each other.

Respective optical isolators were assembled using the above magnetic circuits and underwent a laser tolerance test.

The Faraday elements used were columnar Faraday rotation glass elements having a diameter of 3 mm, a length of 6 mm, and a Verdet constant of 0.21 min/Oe·cm.

The polarizers used were polarizing beam splitters in which two triangular prisms made of BDA glass (manufactured by Nippon Electric Glass Co., Ltd.) were bonded together through a polarizing beam splitting film by optical contact. The laser used was a laser with a pulse width of 10 ns and a repetition frequency of 200 kHz.

In the laser tolerance test, the laser output power was gradually increased with monitoring of the output of light passing through the optical isolator and the output of light at which the transmittance had fallen abruptly was measured as a threshold for laser damage. The results are shown in Table 1 above.

As shown in Table 1, as a result of the measurement of laser tolerance, the thresholds for laser damage to the optical isolators in Examples 1 to 5 were 40 to 100 W. On the other hand, the threshold for laser damage to the optical isolator in Comparative Example 1 was 30 W. In all the samples, the reason why the transmittance fell abruptly was a damage to the polarizer disposed at the light exit side.

REFERENCE SIGNS LIST 1, 31 . . . magnetic circuit
2 . . . through hole
10, 40 . . . Faraday rotator
11 . . . first magnet
12 . . . second magnet
13 . . . third magnet
14 . . . Faraday element
20, 50 . . . magneto-optic device
25 . . . first optical component
26 . . . second optical component

The invention claimed is:

1. A magneto-optic device comprising:
a Faraday rotator which includes a magnetic circuit including first to third magnets each provided with a through hole allowing light to pass through and a Faraday element disposed in the through hole in the magnetic circuit and made of a paramagnetic material capable of transmitting light;
a first optical component disposed at one end of the Faraday rotator in a direction of an optical axis; and
a second optical component disposed at the other end of the Faraday rotator in the direction of the optical axis,
light through the through hole in the magnetic circuit passing through the first optical component and the second optical component,
wherein the magnetic circuit is composed of the first to third magnets arranged coaxially in this order in a front-to-rear direction,
wherein when a direction of light passing through the through hole in the magnetic circuit is defined as the direction of the optical axis,
one of the first and third magnets is magnetized in a direction perpendicular to the direction of the optical axis to have a north pole located toward the through hole,
the other of the first and third magnets is magnetized in a direction perpendicular to the direction of the optical axis to have a south pole located toward the through hole,
the second magnet is magnetized in a direction parallel to the direction of the optical axis to have a north pole located toward the one of the first and third magnets having the north pole located toward the through hole,
wherein a distance from a center of the Faraday element to the first optical component along the direction of the optical axis is different from a distance from the center of the Faraday element to the second optical component along the direction of the optical axis, and
wherein the second optical component is disposed toward the third magnet in the direction of the optical axis, and a ratio $L4/(L1+L2+L3)$ is in a range of not less than 0.2 and less than 0.5 where $(L1+L2+L3)$ represents a sum of respective lengths of the first magnet, the second magnet, and the third magnet along the direction of the optical axis and L4 represents the distance from the center of the Faraday element to the second optical component along the direction of the optical axis.

2. The magneto-optic device according to claim 1, wherein the paramagnetic material is a glass material.

3. The magneto-optic device according to claim 1, wherein the first optical component and the second optical component are polarizers.

4. The magneto-optic device according to claim 1, wherein the Faraday element is disposed in a center of the second magnet.

\* \* \* \* \*